United States Patent
Ryu et al.

(10) Patent No.: US 9,596,723 B2
(45) Date of Patent: Mar. 14, 2017

(54) PWM SIGNAL GENERATING CIRCUIT FOR DC-DC CONVERTER USING DIMMING SIGNAL AND LED DRIVING CIRCUIT HAVING THE SAME IN DIRECT DIGITAL DIMMING METHOD

(75) Inventors: Beom-seon Ryu, Cheongju-si (KR); Chang-sik Lim, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 243 days.

(21) Appl. No.: 13/285,253

(22) Filed: Oct. 31, 2011

(65) Prior Publication Data

US 2012/0112655 A1 May 10, 2012

(30) Foreign Application Priority Data

Nov. 10, 2010 (KR) .......... 10-2010-0111761

(51) Int. Cl.
*H05B 33/08* (2006.01)
*G09G 3/34* (2006.01)

(52) U.S. Cl.
CPC ....... *H05B 33/0815* (2013.01); *G09G 3/3406* (2013.01); *G09G 2310/08* (2013.01); *G09G 2320/064* (2013.01); *G09G 2330/02* (2013.01); *Y02B 20/346* (2013.01)

(58) Field of Classification Search
CPC ............ H05B 33/0818; H05B 33/0815; H05B 33/0845; H05B 37/02; H05B 37/0281; G09G 3/2018; G09G 3/2055; G09G 3/2081; G09G 3/3406; G09G 2320/064; G09G 2310/08

USPC ............. 315/185 R, 291, 360, 302, 297, 307
See application file for complete search history.

(56) References Cited

U.S. PATENT DOCUMENTS

| | | | |
|---|---|---|---|
| 7,321,203 B2 | 1/2008 | Marosek | |
| 8,154,222 B2* | 4/2012 | Korsunsky et al. | 315/308 |
| 2007/0024213 A1* | 2/2007 | Shteynberg et al. | 315/291 |
| 2007/0262724 A1* | 11/2007 | Mednik et al. | 315/125 |
| 2008/0203932 A1* | 8/2008 | Ball | 315/189 |
| 2009/0273290 A1 | 11/2009 | Ziegenfuss | |
| 2009/0295776 A1* | 12/2009 | Yu et al. | 345/212 |

(Continued)

FOREIGN PATENT DOCUMENTS

| | | |
|---|---|---|
| CN | 1282108 A | 1/2001 |
| JP | 2004-166391 A | 6/2004 |

(Continued)

OTHER PUBLICATIONS

'High Efficiency Boost Converter with Synchronous Clock', PE Grady, IBM Technical Disclosure, Feb. 1, 1995.*

(Continued)

*Primary Examiner* — Jimmy Vu
*Assistant Examiner* — Henry Luong
(74) *Attorney, Agent, or Firm* — NSIP Law

(57) ABSTRACT

An LED driving circuit is provided. The LED driving circuit includes an input unit which receives an input dimming signal for driving an LED array, a PWM signal generating unit which extends an on-period of the input dimming signal to form an extended dimming signal, and generates a PWM signal using the extended dimming signal, a DC-DC converter which supplies output voltage to the LED array using the PWM signal, and an LED driving unit which drives the LED array using the input dimming signal.

21 Claims, 8 Drawing Sheets

(56) References Cited

U.S. PATENT DOCUMENTS

| | | | | |
|---|---|---|---|---|
| 2010/0141633 A1* | 6/2010 | Goder | | 345/212 |
| 2010/0164858 A1* | 7/2010 | Kikuchi | | 345/102 |
| 2010/0259177 A1* | 10/2010 | Mednik et al. | | 315/185 R |
| 2010/0277088 A1* | 11/2010 | Bodano | | 315/283 |
| 2011/0227502 A1* | 9/2011 | Kim | | G09G 3/34 |
| | | | | 315/291 |

FOREIGN PATENT DOCUMENTS

| | | |
|---|---|---|
| JP | 2005-315919 A | 11/2005 |
| JP | 2006-211876 A | 8/2006 |
| KR | 10-0968979 B1 | 7/2010 |

OTHER PUBLICATIONS

Linear Technology, LTC3783, 'PWM LED Driver and Boost, Flyback and SEPIC Controller', 2008.*

Chinese Office Action issued in Dec. 3, 2014 in counterpart Chinese Patent Application No. 201110372278.8 (24 pages, in Chinese with English Translation).

\* cited by examiner

FIG. 7

| HIGH(ns) | LOW(ns) | T_period(ns) | f_PWM(KHz) | on_duty(%) | td_1 (ns) | td_2(ns) | td_3(ns) | td_4(ns) | td_5(ns) | td_6(ns) | td_7(ns) | td_8(ns) | remark |
|---|---|---|---|---|---|---|---|---|---|---|---|---|---|
| 3694000 | 3694000 | 7388000 | 0.14 | 50.00 | | 3925 | 3925 | 3925 | 3925 | 3925 | 3925 | 3925 | |
| 694000 | 6694000 | 7388000 | 0.14 | 9.39 | | 3925 | 3925 | 3925 | 3925 | 3925 | 3925 | 3925 | |
| 6694000 | 694000 | 7388000 | 0.14 | 90.61 | | 3925 | 3925 | 3925 | 3925 | 3925 | 3925 | 3925 | |
| 514000 | 514000 | 1028000 | 0.97 | 50.00 | | 3925 | 3925 | 3925 | 3925 | 3925 | 3925 | 3925 | |
| 214000 | 814000 | 1028000 | 0.97 | 20.82 | | 3925 | 3925 | 3925 | 3925 | 3925 | 3925 | 3925 | |
| 814000 | 214000 | 1028000 | 0.97 | 79.18 | | 3925 | 3925 | 3925 | 3925 | 3925 | 3925 | 3925 | |
| 179000 | 179000 | 358000 | 2.79 | 50.00 | | 1075 | 1075 | 1075 | 1075 | 1075 | 1075 | 1075 | |
| 79000 | 279000 | 358000 | 2.79 | 22.07 | | 1075 | 1075 | 1075 | 1075 | 1075 | 1075 | 1075 | |
| 279000 | 79000 | 358000 | 2.79 | 77.93 | | 1075 | 1075 | 1075 | 1075 | 1075 | 1075 | 1075 | |
| 77000 | 77000 | 154000 | 6.49 | 50.00 | | 3075 | 3075 | 3075 | 3075 | 3075 | 3075 | 3075 | clk과 PWM sync |
| 27000 | 127000 | 154000 | 6.49 | 17.53 | | 3075 | 3075 | 3075 | 3075 | 3075 | 3075 | 3075 | |
| 127000 | 27000 | 154000 | 6.49 | 82.47 | | 3075 | 3075 | 3075 | 3075 | 3075 | 3075 | 3075 | |
| 20000 | 100000 | 120000 | 8.33 | 16.67 | | 75 | 75 | 75 | 75 | 75 | 75 | 75 | |
| 100000 | 20000 | 120000 | 8.33 | 83.33 | | 75 | 75 | 75 | 75 | 75 | 75 | 75 | |
| 60000 | 60000 | 120000 | 8.33 | 50.00 | | 75 | 75 | 75 | 75 | 75 | 75 | 75 | |
| 28000 | 28000 | 56000 | 17.86 | 50.00 | | 2075 | 2075 | 2075 | 2075 | 2075 | 2075 | 2075 | |
| 18000 | 38000 | 56000 | 17.86 | 32.14 | | 2075 | 2075 | 2075 | 2075 | 2075 | 2075 | 2075 | |
| 38000 | 18000 | 56000 | 17.86 | 67.86 | | 2075 | 2075 | 2075 | 2075 | 2075 | 2075 | 2075 | |
| 22000 | 22000 | 44000 | 22.73 | 50.00 | | 1925 | 1925 | 1925 | 1925 | 1925 | 1925 | 1925 | |
| 12000 | 32000 | 44000 | 22.73 | 27.27 | | 1925 | 1925 | 1925 | 1925 | 1925 | 1925 | 1925 | |
| 32000 | 12000 | 44000 | 22.73 | 72.73 | | 1925 | 1925 | 1925 | 1925 | 1925 | 1925 | 1925 | |

…

PWM SIGNAL GENERATING CIRCUIT FOR DC-DC CONVERTER USING DIMMING SIGNAL AND LED DRIVING CIRCUIT HAVING THE SAME IN DIRECT DIGITAL DIMMING METHOD

CROSS-REFERENCE TO RELATED APPLICATIONS

This application claims the benefit under 35 U.S.C. §119(a) of Korean Patent Application No. 2010-0111761, filed in the Korean Intellectual Property Office on Nov. 10, 2010, the entire disclosure of which is incorporated herein by reference for all purposes.

BACKGROUND

1. Field

The following description relates to a PWM signal generating circuit for a DC-DC converter using a dimming signal and an LED driving circuit using the same, and, more particularly, to a PWM signal generating circuit for a DC-DC converter which may reduce the ripple of output voltage by prolonging a time during which an input dimming signal is turned, on and a Light Emitting Diode (LED) driving circuit using the same.

2. Description of the Related Art

A Liquid Crystal Display (LCD) type of display apparatus has become popular and widely used due to it having many advantages compared to other types of display apparatuses. A few of the advantages of the LCD over the other types of display apparatuses are a slim thickness, light weight, low power consumption, and low driving voltage. However, an LCD does not emit light by itself, and thus a backlight is used in order to supply light to an LCD panel.

Conventionally, a Cold Cathode Fluorescent Lamp (CCFL) and a Light Emitting Diode (LED) are two elements that are used as the aforementioned backlight source of an LCD. However, since the CCFL uses mercury, it may cause environmental pollution, as well as having a low speed response. In addition, the CCFL has other disadvantages such as poor color reproduction and not being appropriate to realize an LCD panel which has a high density, small size, and thin shape.

On the other hand, the LED does not use a material harmful to the environment, and is capable of performing with faster response time as compared to the CCFL. In addition, the LED has the advantages of good color reproduction and an ability to adjust brightness and color temperature arbitrarily by adjusting the amount of light of red, green, and blue LEDs. In addition, the LED is suitable for realizing an LCD panel of a high density, small size, and thin shape. Therefore, the LED has become more widely used as a light source for a backlight of an LCD panel in recent years.

As such, in conventional applications, if an LCD backlight using an LED employs a plurality of LEDs connected in a serial fashion, a driving circuit to provide constant current to the LEDs is required, and a dimming circuit to adjust brightness and color temperature arbitrarily, or perform temperature compensation, is required.

In more detail, different dimming methods used in an LCD backlight using an LED include an analog dimming method and digital dimming methods. The analog dimming method includes adjusting the brightness of the LED by adjusting an amount of electric current supplied to each of the LEDs. A pulse width modulation (PWM) dimming method, which is one of the digital dimming methods, includes adjusting the brightness of the LED by adjusting a ratio of on-off time of each LED. For example, if a PWM signal having an on-off time ratio of 4:1 is provided to each LED, the brightness of the LED reaches 80% of maximum brightness.

In order to adjust the brightness of the LED in the above-described digital dimming method, a clock signal of a DC-DC converter for adjusting power of the LED and a dimming signal for adjusting an amount of electric current in the LED are separately provided. In general, the frequency of the clock signal of the DC-DC converter is relatively high, and the frequency of the dimming signal is relatively low, and the clock signal of the DC-DC converter and the dimming signal are not synchronized with each other. Further, an on-period of the clock signal and the dimming signal are typically very short relative to the overall period of the respective signals.

In this case, if an on-period of the dimming signal is shorter than the period of the clock signal, the DC-DC converter may not be boosted at a time at which a specific dimming signal is turned on. If the DC-DC converter is not boosted, it is difficult to maintain a desired output voltage to drive the LED. This will be explained in more detail with reference to FIG. 8.

FIG. 8 illustrates waveforms occurring in an operation of generating a PWM signal based on a dimming signal in the prior art. Referring to FIG. 8, 'PWMI' indicates a dimming signal input from outside (PAD) and 'B_CLK' indicates a boosting clock signal. In addition, 'PWM_OUT' indicates a PWM signal supplied to the gate of the power transistor of the DC-DC converter, and 'VOUT' indicates output voltage in a case in which the above-described PWM-OUT is supplied to the DC-DC converter.

Referring to FIG. 8, in the case in which an on-period of the dimming signal (PWMI) is shorter than the period of the clock signal (B-CLK) of the DC-DC converter, the PWM signal (PWM_OUT) supplied to the DC-DC converter may not be generated in response to the dimming signal (PWMI) being turned on. If no PWM signal is generated during one period of the dimming signal (PWMI), the DC-DC converter cannot maintain a stable output voltage.

SUMMARY

Aspects of the various examples described herein relate to a PWM signal generating circuit for a DC-DC converter which may reduce the ripple of output voltage by prolonging a time during which an input dimming signal is turned on, and an LED driving circuit using the same.

In one general aspect, there is provided a PWM signal generating circuit which generates a PWM signal for a DC-DC converter using an input dimming signal, including an oscillator which generates a clock signal having a predetermined frequency, an extending unit which extends an on-period of the input dimming signal to form an extended dimming signal, and a signal generating unit which generates the PWM signal in response to the clock signal having a falling edge during an on-period of the extended dimming signal.

The PWM signal generating circuit may further include a controlling unit which controls an operation of the PWM signal generating unit according to received feedback regarding voltage of the DC-DC converter generated by the generated PWM signal.

The extending unit may include a delay unit which delays the input dimming signal, and an OR gate which outputs the extended dimming signal by receiving the input dimming signal and the delayed dimming signal.

The delay unit may delay the input dimming signal such that the on-period of the extended dimming signal becomes approximately equal to or longer than a clock signal period of the oscillator.

The PWM signal generating circuit may further include an oscillator reset unit which resets the oscillator at a falling edge of the extended dimming signal.

The oscillator reset unit may include a delay unit which delays the extended dimming signal, a NOT gate which inverts the extended dimming signal, and an AND gate which receives an output of the delay unit and an output of the NOT gate and outputs a logical result as a reset signal of the oscillator.

In another general aspect, there is provided an LED driving circuit including an input unit which receives an input dimming signal for driving an LED array, a PWM signal generating unit which extends an on-period of the input dimming signal to form an extended dimming signal, and generates a PWM signal using the extended dimming signal, a DC-DC converter which supplies output voltage to the LED array using the PWM signal, and an LED driving unit which drives the LED array using the input dimming signal.

The PWM signal generating unit may delay a falling edge of the input dimming signal so that an on-period of the extended dimming signal becomes approximately equal to or longer than a period of an internal clock signal.

The PWM signal generating unit may initialize the internal clock at a falling edge of the extended dimming signal and generate a PWM signal of a same period.

The PWM signal generating unit may include an oscillator which generates a clock signal having a predetermined frequency, an extending unit which extends the on-period of the input dimming signal to form the extended dimming signal, and a signal generating unit which generates the PWM signal in response to the clock signal having a falling edge during the on-period of the extended dimming signal.

The PWM signal generating unit may further include a controlling unit which controls an operation of the PWM signal generating unit according to received feedback regarding output voltage of the DC-DC converter.

The extending unit may include a delay unit which delays the input dimming signal, and an OR gate which outputs the extended dimming signal by receiving the input dimming signal and the delayed dimming signal.

The delay unit may delay the input dimming signal such that the on-period of the extended dimming signal becomes approximately equal to or longer than a clock signal period of the oscillator.

The PWM signal generating unit may further include an oscillator reset unit which resets the oscillator at a falling edge of the extended dimming signal.

The oscillator reset unit may include a delay unit which delays the extended dimming signal, a NOT gate which inverts the extended dimming signal, and an AND gate which receives an output of the delay unit and an output of the NOT gate and outputs a logical result as a reset signal of the oscillator.

The input unit, the PWM signal generating unit, and the LED driving unit may be embodied as a single chip.

According to another general aspect, there is provided a method of generating a PWM signal using an input dimming signal, the method including generating an extended on-period from an input on-period of the input dimming signal, and generating the PWM signal in response to a clock signal having a falling edge during the extended on-period.

The generating of the extended on-period may include delaying the input dimming signal, and combining the delayed input dimming signal with the input dimming signal to generate an extended dimming signal.

The delayed input dimming signal and the input dimming signal may each be input to an OR gate to generate the extended dimming signal.

The extended on-period may be approximately equal to or longer than a period of the clock signal.

Other features and aspects will be apparent from the following detailed description, the drawings, and the claims.

BRIEF DESCRIPTION OF THE DRAWINGS

FIG. 7 illustrates a delay time of an example LED driving circuit in response to various frequencies and various on-duty dimming signals being input.

Figure 1:
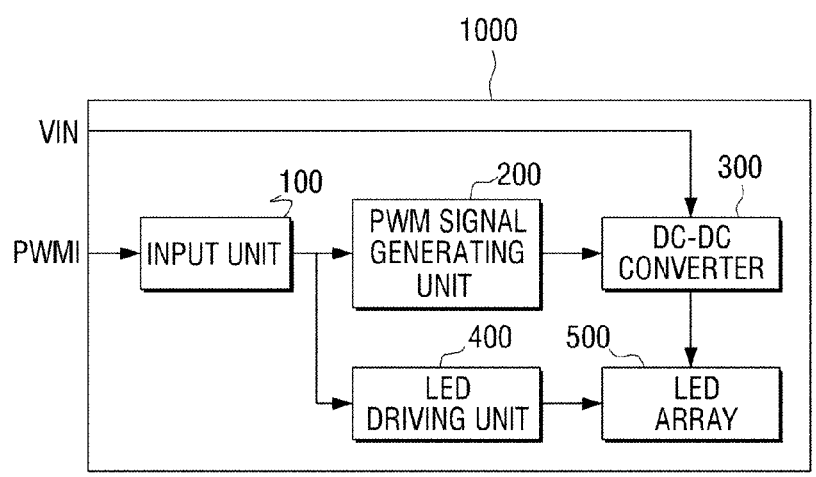
FIG. 1 illustrates an example LED driving circuit.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

FIG. 1 illustrates an example LED driving circuit (or a light emitting diode driving circuit, hereinafter referred to as an LED driving circuit).

Referring to the example illustrated in FIG. 1, the LED driving circuit 1000 includes an input unit 100, a PWM signal generating unit 200, a DC-DC converter 300, an LED driving unit 400, and an LED array 500.

The input unit 100 receives a dimming signal to drive an LED. In more detail, an LED digital dimming method may include, for example, a direct mode, a fixed phase mode, and a phase shift mode. Herein, the direct mode controls both PWM frequency and on-duty, or length of the on-period, from outside (PAD), and the fixed phase mode and the phase shift mode generate PWM frequency internally and controls only on-duty after receiving it from PAD. The presently described example operates in the direct mode, and the input unit 100 receives both PWM frequency and on-duty as a dimming signal from outside. However, the example LED driving circuit 1000 is not limited to this mode.

The PWM signal generating unit 200 (or 'a PWM signal generating circuit', hereinafter referred to as 'a PWM signal generating unit') extends the on-period of an input dimming signal and generates a PWM signal using the extended dimming signal. In more detail, the PWM signal generating unit 200 extends the dimming signal, for example, by delaying a falling edge timing of an input dimming signal so that the on-period of the dimming signal input to the input unit 100 is longer than the period of an internal clock signal. In other words, the PWM signal generating unit 200 may delay the input dimming signal from moving to an off-period until a falling edge of the internal clock signal occurs. If the internal clock signal is a falling edge when the extended dimming signal is turned on, a PWM signal having a rising edge may be generated. In this case, the PWM signal generating unit 200 may initialize the internal clock at the falling edge of the extended dimming signal to generate a PWM signal having the same frequency as the input dimming signal. A more detailed configuration of the PWM signal generating unit 200 will be explained with reference to FIGS. 2 and 4.

The DC-DC converter 300 provides output voltage to the LED array 500 using a PWM signal. In more detail, the DC-DC converter 300 converts DC voltage based on the PWM signal generated by the PWM signal generating unit 200, and provides the converted DC voltage to the LED array 500. In this case, for example, the DC-DC converter 300 may provide voltage corresponding to the forward bias voltage of the LED array 500 to the LED array 500 so that the LED array 500 operates in a saturation region.

The LED driving unit 400 drives an LED array using a dimming signal. In more detail, the LED driving unit 400 may adjust a driving current in the LED array 500 using the dimming signal input by the input unit 100.

As such, the LED driving circuit 1000 according to this example may generate a PWM signal even if the on-period of a dimming signal is short, since the LED driving circuit 1000 may extend the input dimming signal. Accordingly, even if the on-period of a dimming signal is short, a PWM signal having a rising edge is supplied to the DC-DC converter 300, and thus the DC-DC converter may provide the LED array 500 with output voltage to drive an LED stably. Since the LED driving circuit 1000 provides the LED array 500 with output voltage stably, ripple caused by overshoot, flicker, and noise may be reduced or prevented.

Figure 2:
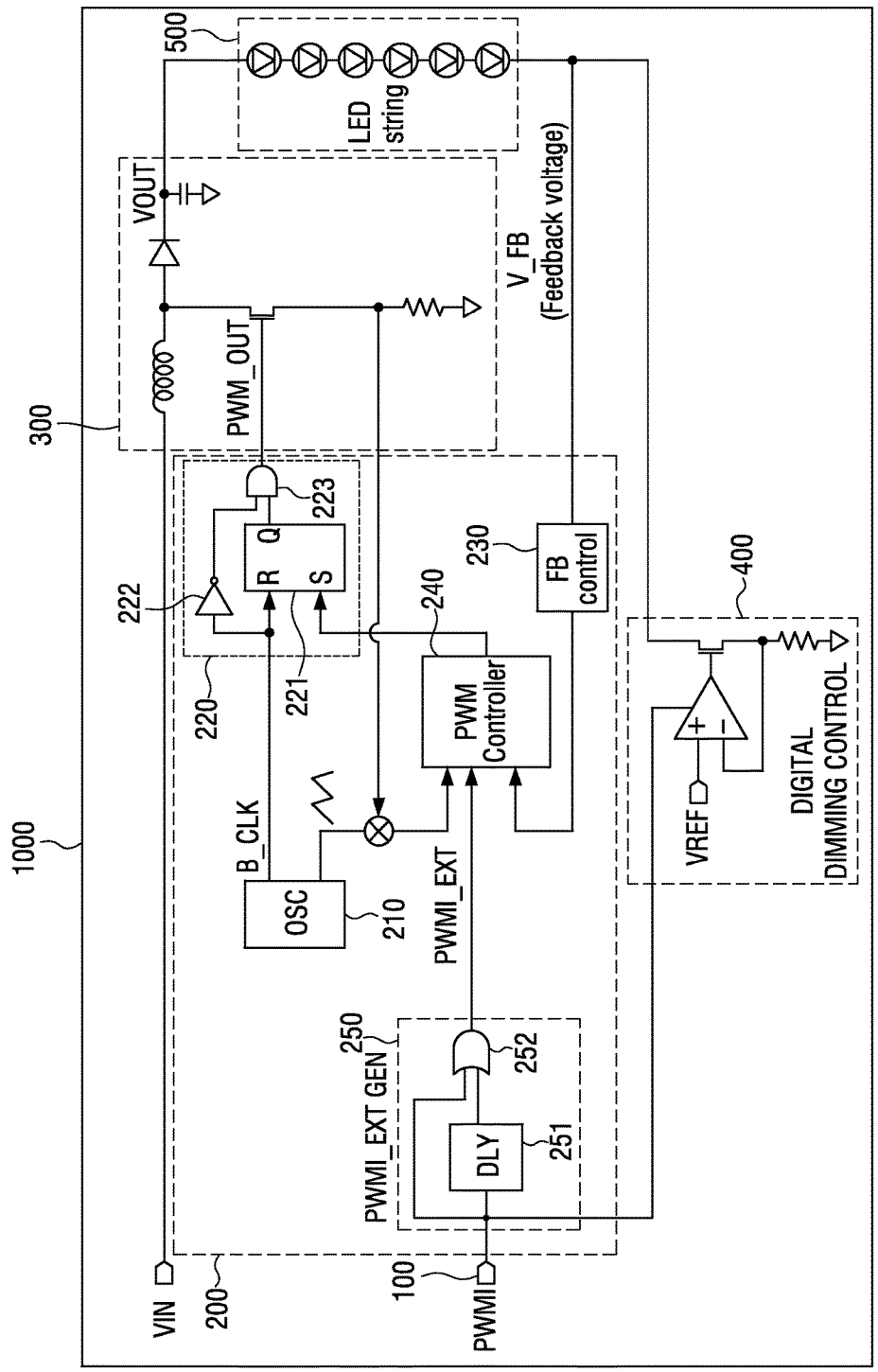
FIG. 2 illustrates an example circuit diagram of an LED driving circuit.

FIG. 2 illustrates an example circuit diagram of an LED driving circuit.

Referring to FIG. 2, the LED driving unit 1000 includes the input unit 100, the PWM signal generating unit 200, the DC-DC converter 300, the LED driving unit 400, and the LED array 500. According to various example configurations, one or more of the input unit 100, the PWM signal generating unit 200, and the LED driving unit 400 may be embodied as a single chip.

The input unit 100 receives a dimming signal to drive an LED from outside of the LED driving circuit.

The PWM signal generating unit 200 generates a PWM signal (PWM_OUT) provided to the DC-DC converter 300. In more detail, the example PWM signal generating unit 200 includes an oscillator 210, a signal generating unit 220, a feedback nit 230, a controlling unit 240, and an extending unit 250.

The oscillator 210 generates a clock signal (B_CLK) having a predetermined frequency.

The signal generating unit 220 generates a PWM signal (PWM_OUT) if a clock signal (B_CLK) is a falling edge when an extended dimming signal (PWMI_EXT) is turned on. In more detail, the signal generating unit 220 may include an RS flip flop 221, a NOT gate 222, and an AND gate 223.

The RS flip flop 221 receives a reset of the clock signal (B_CLK) of the oscillator 210 and receives the output of the controlling unit 240 as a set input. The RS flip flop 221 provides output to the AND gate 223. Herein, the RS flip flop 221 outputs '1' if a set signal is input and outputs '0' if a reset signal is input.

If the clock signal (B_CLK) of the oscillator 210 is input, the NOT gate 222 inverts the input clock signal (B_CLK) of the oscillator 210 and provides the inverted clock signal (B_CLK) to the AND gate 223.

The AND gate 223 receives the output signal of the RS flip flop 221 and the output signal of the NOT gate 222, and outputs the logical result of multiplying the output signal of the RS flip flop 221 and the output signal of the NOT gate 222 as a PWM signal (PWM_OUT).

The feedback unit 230 measures power provided to the LED array 500 and provides the measured power to the controlling unit 240. In this example, the voltage (V_FB) of the node at which the LED array 500 joins the LED driving unit 400 is measured, but the configuration is not limited to this example. For instance, as one alternative example, the output voltage (Vout) of the DC-DC converter 300 may be measured.

The controlling unit 240 controls the signal generating unit 220. In more detail, the controlling unit 240 receives the clock signal (B_CLK) generated by the oscillator 210, the dimming signal (PWMI_EXT) extended by the extending unit 250, and the feedback signal of the feedback unit 230, and may control the signal generating unit 220 to generate a PWM signal (PWM_OUT) having a rising edge if the clock signal (B_CLK) is a falling edge while the extended dimming signal (PWMI_EXT) is turned on. In addition, the controlling unit 240 may control the signal generating unit 220 not to generate a PWM signal (PWM_OUT) if power provided to the LED array 500 is higher than a predetermined voltage.

The extending unit 250 extends a period during which an input dimming signal PWMI is turned on. In more detail, the extending unit 250 may include a delay unit 251 and an OR gate 252.

The delay unit 251 delays a dimming signal PWMI input from the input unit 100. In this case, the delay unit 251 may delay the input dimming signal so that a period during which the extended dimming signal is turned on is longer than, or approximately equal to, the period of the clock signal of the oscillator 210.

The OR gate 252 receives the dimming signal PWMI and the delayed dimming signal and outputs an extended dimming signal (PWMI_EXT). Specifically, the OR gate 252 may receive the dimming signal and the output of the delay unit 251 and output the logical sum of the input dimming signal and the delayed dimming signal as the extended dimming signal.

The DC-DC converter 300 may be a boost switcher including an inductor, a boost gate, and a diode. Since the DC-DC converter 300 illustrated in FIG. 2 may perform the same operation as a general boost switcher, a detailed description thereof will not be provided.

The LED driving unit 400 is a constant current controller. Since the LED driving unit 400 illustrated in FIG. 2 may be a constant current controller which is used in a general LED driving circuit, a detailed description thereof will not be provided.

Hereinafter, the operation of the LED driving circuit 1000 illustrated in FIG. 2 will be explained with reference to FIG. 3.

Figure 3:
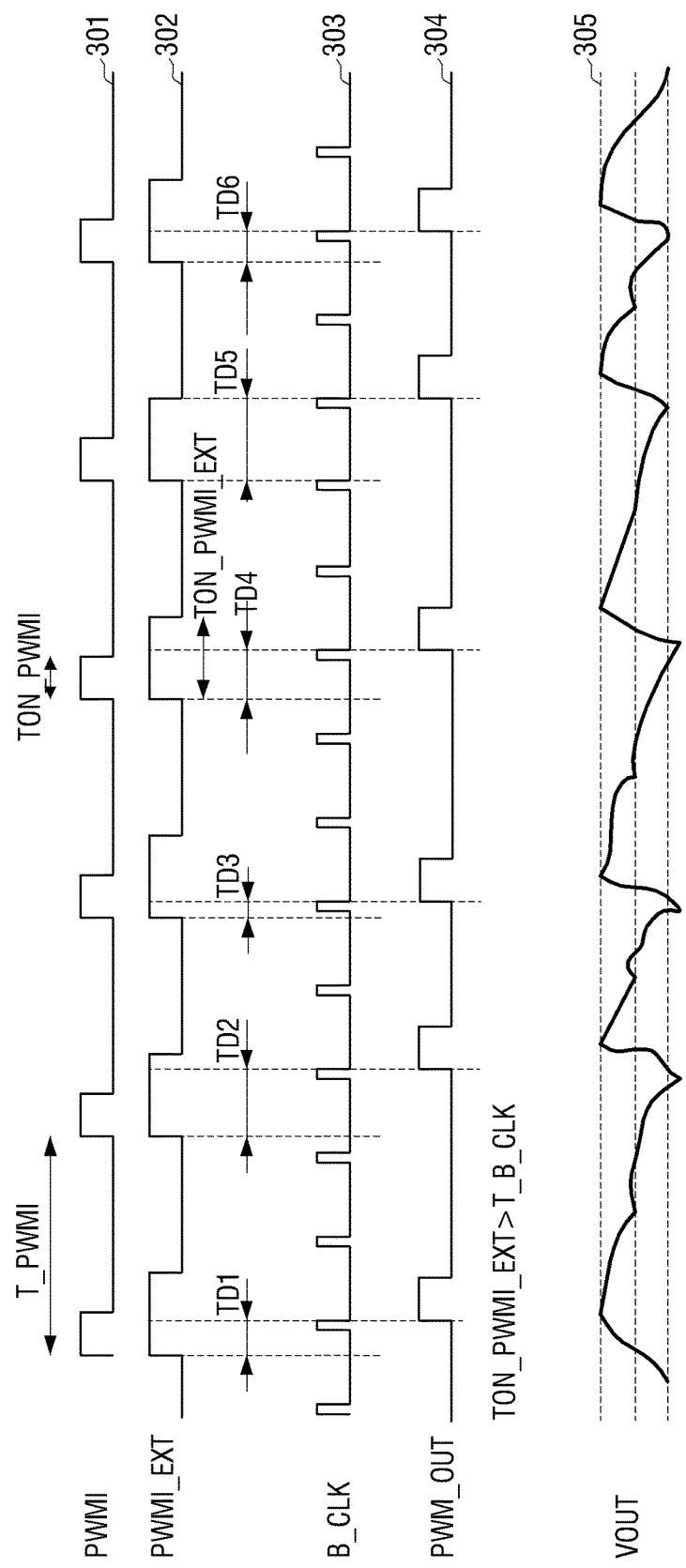
FIG. 3 illustrates waveforms occurring in an operation of the LED driving circuit illustrated in FIG. 2.

FIG. 3 illustrates waveforms occurring in an operation of the LED driving circuit 1000 illustrated in FIG. 2.

FIG. 3 illustrates a dimming signal (PWMI, 301), an extended dimming signal (PWMI_EXT, 302), a clock signal (B_CLK, 303), a PWM signal (PWM_OUT, 304), and the output voltage (VOUT, 305) of the DC-DC converter 300.

In response to the dimming signal 301 being input from the input unit 100, the extending unit 250 delays the falling edge of the input dimming signal 301 and generates the dimming signal 302 of which the on-period is extended as illustrated in FIG. 3.

Figure 8:
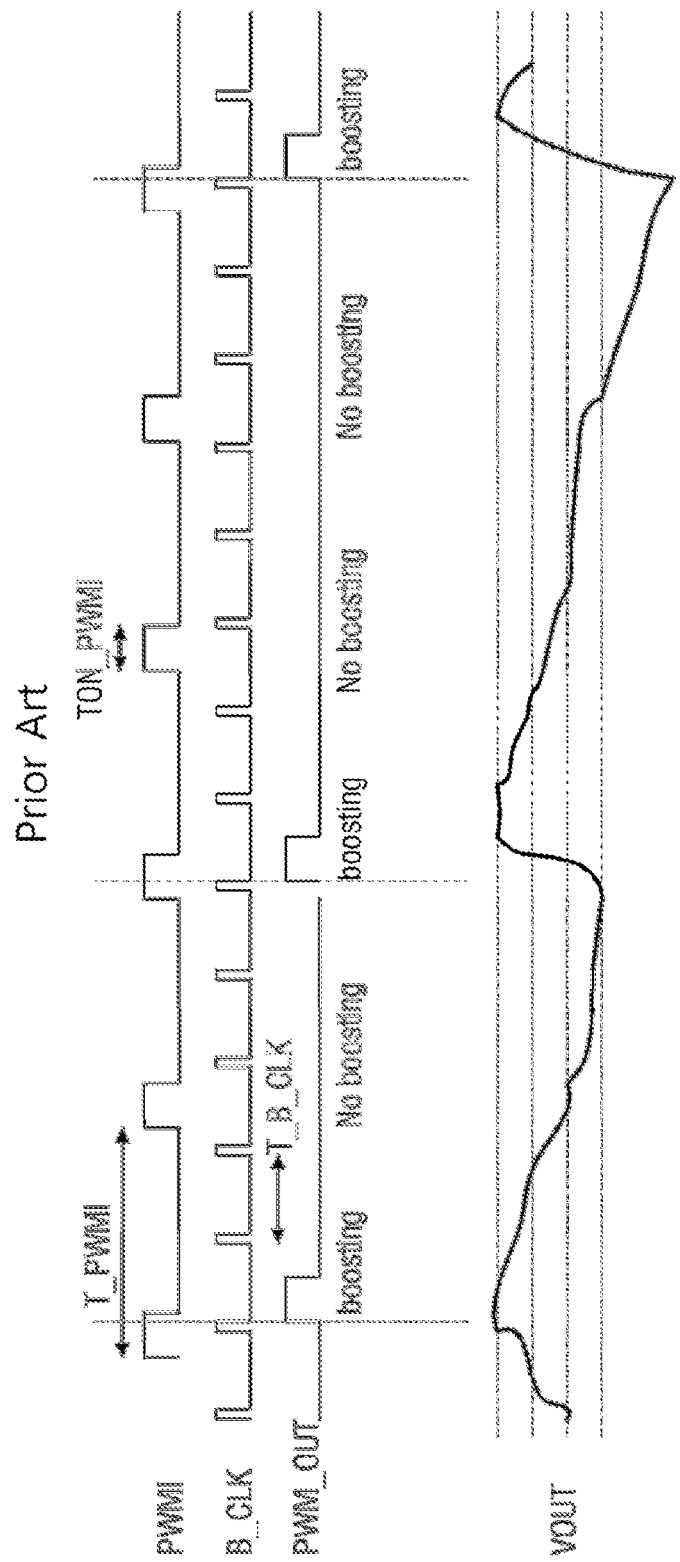
FIG. 8 illustrates waveforms occurring in an operation of generating a PWM signal based on a dimming signal in the prior art.

Since the dimming signal 301 is extended as described above, at least one internal clock signal 303 has a falling edge during a time in which the extended dimming signal 302 is in the on-period. In more detail, the signal generating unit 220 generates a PWM signal having a rising edge at a time at which the dimming signal PWMI is turned on and the internal clock signal 303 is at a falling edge, and thus, if the signal generating unit 220 uses the extended dimming signal 302, the signal generating unit 220 may generate a PWM signal 304 corresponding to the dimming signal 301. For example, as illustrated in FIG. 3, for each on-period of the PWMI 301, there will be a corresponding on-period for the PWM signal 304, as opposed to the situation illustrated in FIG. 8, in which PWMI signals may enter an on-period for which no PWM_OUT signal will have a corresponding on-period.

As such, the PWM signal generating unit 200 according to this example extends and uses the input dimming signal PWMI, and thus a PWM signal (PWM_OUT) may be generated even in a section in which the on-period of the dimming signal PWMI is short. Since at least one PWM signal (PWM_OUT) is supplied to the DC-DC converter 300 even if the on-period of the dimming signal is short, the DC-DC converter 300 may provide the LED array 500 with output voltage for driving the LED array 500 in a more stable fashion.

Figure 4:
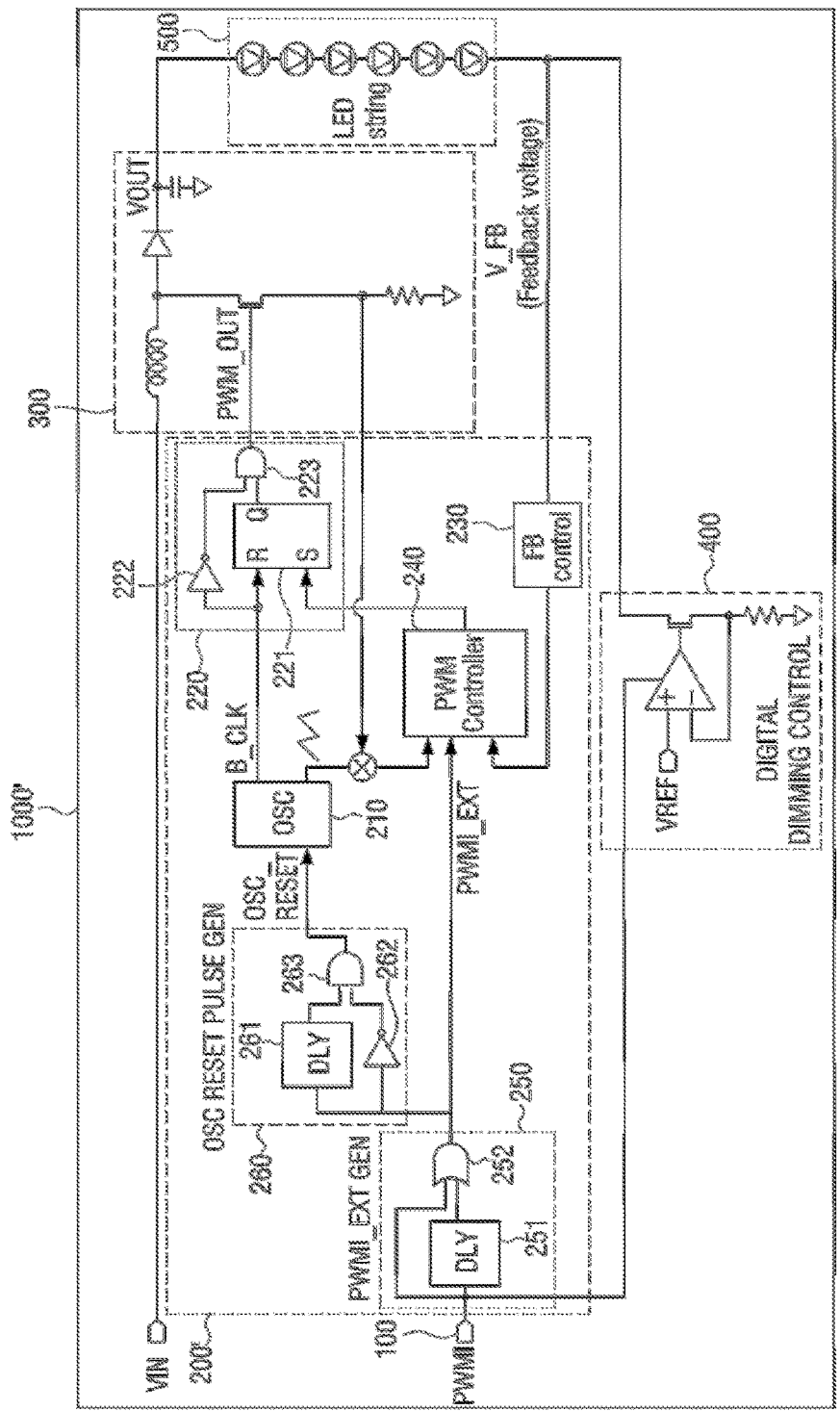
FIG. 4 illustrates another example circuit diagram of an LED driving circuit.

However, as the extended dimming signal (PWMI_EXT 302) is not synchronized with the internal clock signal (B_CLK 303), the output PWM signal (PWM_OUT 304) does not have a consistent period. Therefore, if a system requires a consistent PWM signal (PWM_OUT) having a consistent period, an oscillator reset unit 260 may be added to embody the PWM signal generating unit 200' as illustrated in FIG. 4. Hereinafter, an example LED driving circuit to which the oscillator reset unit 260 is added will be described.

FIG. 4 illustrates another example of an LED driving circuit.

Referring to FIG. 4, the LED driving circuit 1000' includes the input unit 100, a PWM signal generating unit 200', the DC-DC converter 300, the LED driving unit 400, and the LED array 500. Herein, as described in reference to FIG. 2, one or more of the input unit 110, the PWM signal generating unit 200, and the LED driving unit 400 may be embodied as a single chip.

Since the input unit 100, the DC-DC converter 300, the LED driving unit 400, and the LED array 500 may have the same configuration as those illustrated in FIG. 2, further description thereof will not be provided.

The PWM signal generating unit 200' includes the oscillator 210, the signal generating unit 220, the feedback unit 230, the controlling unit 240, the extending unit 250, and the oscillator reset unit 260. As compared to the PWM signal generating unit illustrated in FIG. 2, the PWM signal generating unit 200' illustrated in FIG. 4 further includes the oscillator reset unit 260.

The oscillator 210 generates a clock signal (B_CLK) having a predetermined frequency and receives the output (OSC_RESET) of the oscillator reset unit 260. Accordingly, if a reset signal (OSC_RESET) is input from the oscillator reset unit 260, the oscillator 210 is reset at a time at which the reset signal (OSC_RESET) is input.

The signal generating unit 220 generates a PWM signal in response to the clock signal (B_CLK) reaching a falling edge during a time in which the extended dimming signal (PWMI_EXT) is in an on-period. The configuration of the signal generating unit 220 may be similar or the same as that illustrated in FIG. 2, and thus further description thereof will not be provided.

The feedback unit 230 measures power supplied to the LED array 500 and provides the measured power to the controlling unit 240.

The controlling unit 240 controls the signal generating unit 220. In more detail, the controlling unit 240 receives the clock signal (B_CLK) generated by the oscillator 210, the dimming signal (PWMI_EXT) extended by the extending unit 250, and the feedback signal of the feedback unit 230, and may control the signal generating unit 220 to generate a PWM signal (PWM_OUT) having a rising edge in response to the clock signal (B_CLK) reaching a falling edge during a time in which the extended dimming signal (PWMI_EXT) is in an on-period. In addition, the controlling unit 240 may control the signal generating unit 220 so as not to generate a PWM signal (PWM_OUT) if power provided to the LED array 500 is higher than predetermined voltage.

The extending unit 250 extends a period during which an input dimming signal PWMI is turned on. In more detail, the extending unit 250 may include a delay unit 251 and an OR gate 252.

The oscillator reset unit 260 resets the oscillator 210 at a falling edge of the extended dimming signal (PWMI_EXT). More specifically, the oscillator reset unit 260 may comprise a delay unit 261, a NOT gate 262, and an AND gate 263.

The delay unit 261 delays the extended dimming signal (PWMI_EXT) that is output from the extending unit 250.

The NOT gate 262 inverts the extended dimming signal (PWMI_EXT) that is output from the extending unit 250.

The AND gate 263 receives the output signal of the delay unit 261 and the output signal of the NOT gate 262, and outputs the logical result of multiplying the output signal of the delay unit 261 and the output signal of the NOT gate 262 as the reset signal (OSC_RESET) of the oscillator 210.

Hereinafter, the operation of the LED driving circuit 1000' illustrated in FIG. 4 will be explained with reference to FIG. 5.

Figure 5:
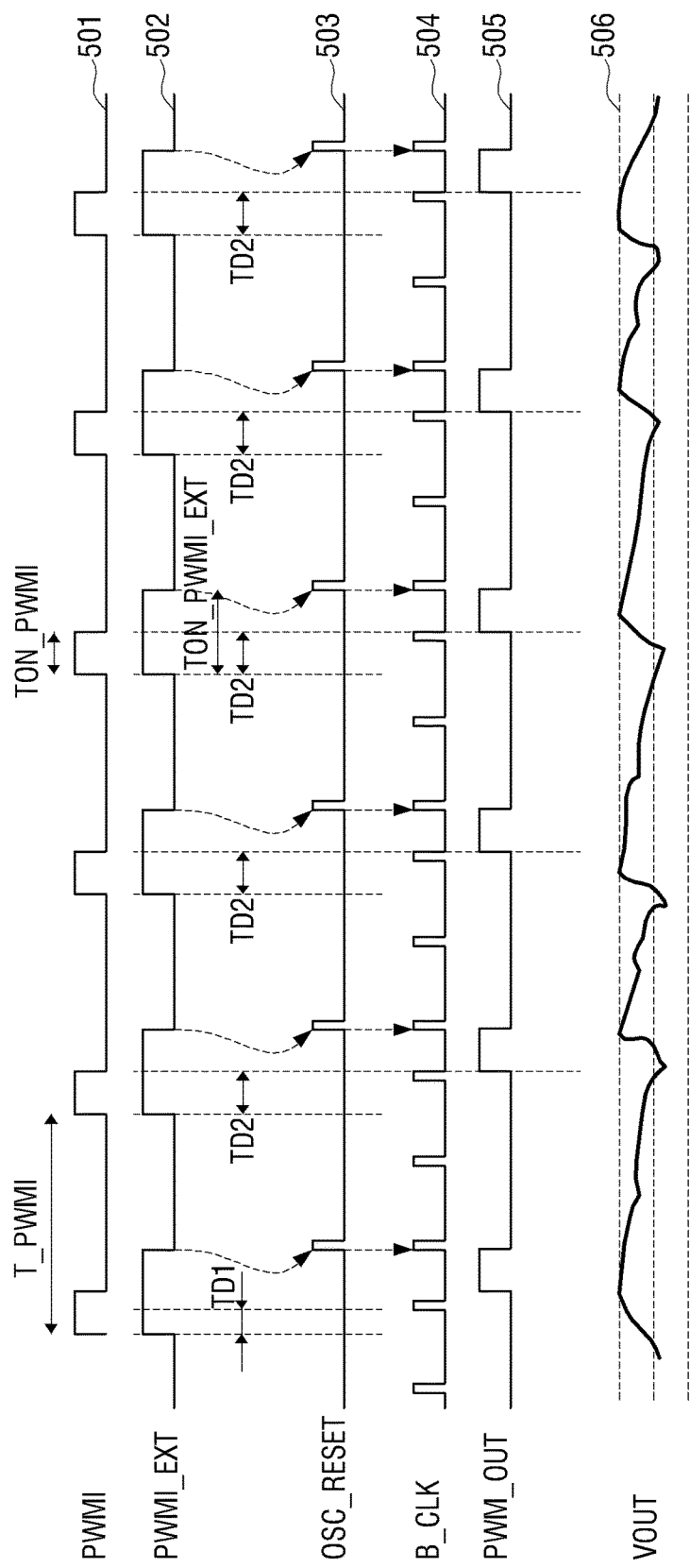
FIG. 5 illustrates waveforms occurring in an operation of the LED driving circuit illustrated in FIG. 4.

FIG. 5 illustrates waveforms occurring in the operation of the LED driving circuit 1000' illustrated in FIG. 4.

FIG. 5 illustrates a dimming signal (PWMI, 501), an extended dimming signal (PWMI_EXT, 502), a reset signal (OSC_RESET, 503), a clock signal (B_CLK, 504), a PWM signal (PWM_OUT, 505), and the output voltage (VOUT, 506) of the DC-DC converter.

In response to the dimming signal 501 being input from the input unit 100, the extending unit 250 generates the extended dimming signal 502 by extending the on-period of the input dimming signal 501.

The oscillator reset unit 260 generates the reset signal 503 which resets the oscillator 210 at every falling edge of the extended dimming signal 502. Thus, the oscillator 210 generates the clock signal 504 as illustrated in FIG. 5.

Meanwhile, as the signal generating unit 220 generates a PWM signal 505 using the clock signal 504 of the oscillator 210 and the extended dimming signal 502, the generated PWM signal 505 has a consistent period as illustrated in FIG. 5.

Since the PWM signal 505 supplied to the DC-DC converter 300 has a consistent period, ripple occurring in the output voltage 506 of the DC-DC converter 300 is minimized.

Figure 6:
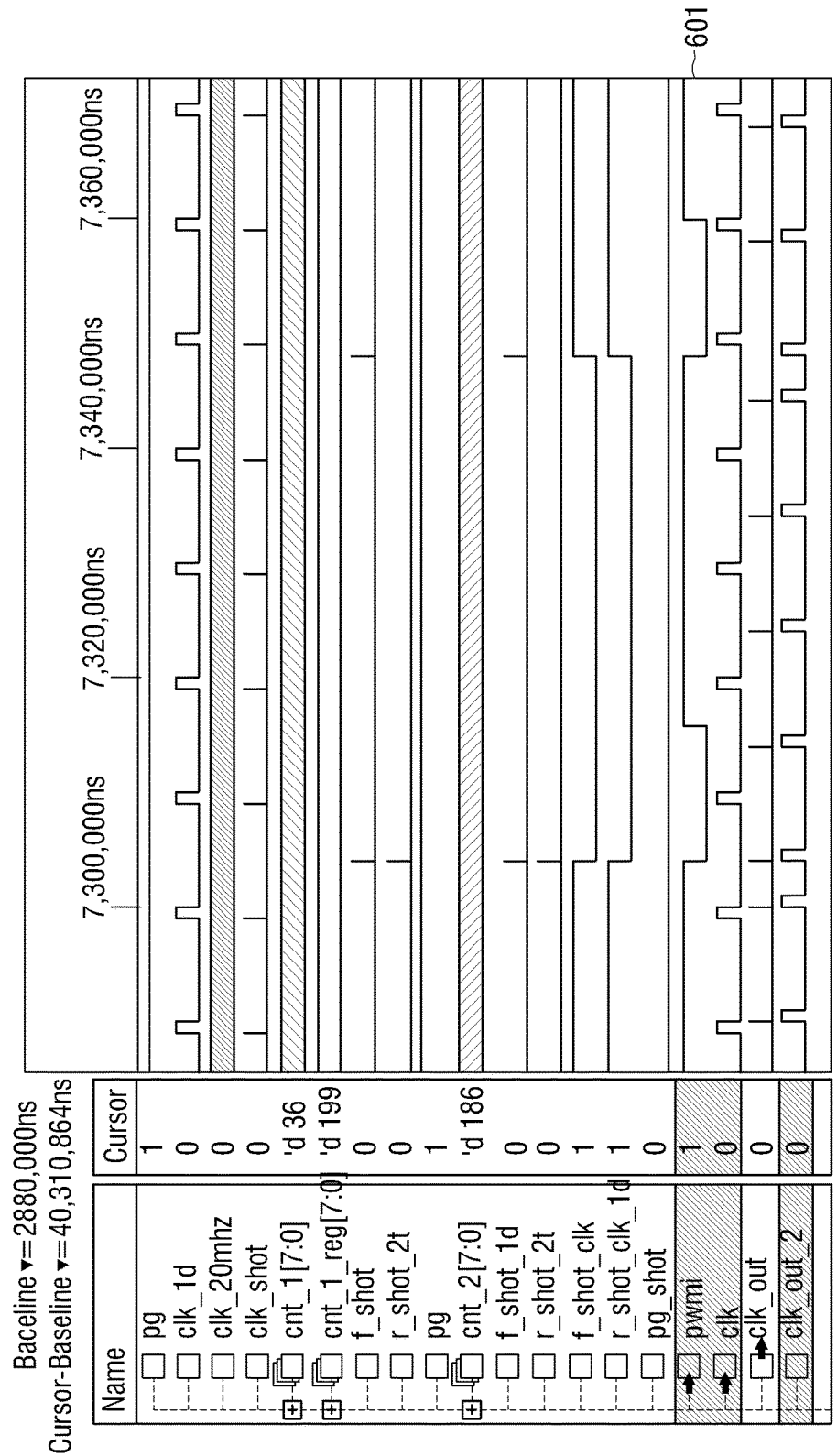
FIG. 6 illustrates waveforms occurring in a simulation result of an oscillator and oscillator reset unit illustrated in FIG. 4.

FIG. 6 illustrates waveforms occurring in a simulation result of the oscillator 210 and the oscillator reset unit 260 illustrated in FIG. 4.

Referring to FIG. 6, it can be seen that the output clock (CLK_OUT2) of the oscillator is reset at the falling edge of the dimming signal PWMI. As the clock of the oscillator is reset at the falling edge of the extended dimming signal, the rising edges of the PWM signal generated from the signal generating unit 220 have consistent intervals. As the PWM signal has the rising edges having consistent intervals, the ripple of the output voltage of the DC-DC converter 300 may be reduced.

FIG. 7 illustrates a delay time of an example LED driving circuit in response to various frequencies and various on-duty dimming signals being input.

Referring to FIG. 7, if a dimming signal has the same frequency, the rising edge interval of a generated PWM signal is maintained consistently. As the PWM signal has consistent periods, the output voltage ripple of the DC-DC converter may be reduced.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A pulse width modulation (PWM) signal generating circuit, comprising:
   a signal extending circuit configured to
      receive an input dimming signal, wherein the input dimming signal comprises a plurality of pulses alternately having an on-period and off-period, and
      generate an extended dimming signal, wherein the extended dimming signal has, for each on-period of the input dimming signal, an on-period exceeding the on-period of the input dimming signal;
   an oscillator configured to generate a clock signal not synchronized with the input dimming signal; and
   a signal generating circuit configured to generate a PWM signal pulse for each on-period of the extended dimming signal, in response to the clock signal having a falling edge during the on-period of the extended dimming signal.

2. The PWM signal generating circuit as claimed in claim 1, further comprising:
   a controlling circuit configured to control an operation of the signal generating circuit, by using a feedback voltage based on an output voltage from a direct current-to-direct-current (DC-DC) converter.

3. The PWM signal generating circuit as claimed in claim 1, wherein the signal extending circuit comprises:
   a delay circuit configured to generate a delayed dimming signal by delaying the input dimming signal; and
   an OR gate configured to generate the extended dimming signal based upon a logical-OR operation executed upon the input dimming signal and the delayed dimming signal.

4. The PWM signal generating circuit as claimed in claim 3, wherein the delay circuit delays the input dimming signal such that the on-period of the extended dimming signal becomes approximately equal to or longer than the period of the clock signal generated by the oscillator.

5. The PWM signal generating circuit as claimed in claim 1, further comprising:
   an oscillator reset circuit configured to reset generation of the clock signal in response to detecting a falling edge of the extended dimming signal.

6. The PWM signal generating circuit as claimed in claim 5, wherein the oscillator reset circuit comprises:
   a delay circuit configured to generate a delayed version of the extended dimming signal;
   a NOT gate configured to generate an inverted version of the extended dimming signal; and
   an AND gate configured to generate a reset signal to reset the oscillator based upon a logical-AND operation executed on the delayed version of the extended dimming signal and the inverted version of the extended dimming signal.

7. The PWM signal generating circuit as claimed in claim 1, wherein the signal generating circuit is configured to generate the PWM signal pulse in response to each falling edge of the clock signal occurring during an on-period of the extended dimming signal.

8. A light emitting diode (LED) driving circuit comprising:
   a pulse-width modulation (PWM) signal generating circuit configured to
      receive an input dimming signal, the input dimming signal comprising a plurality of pulses alternately having an on-period and off-period,
      generate an extended dimming signal, wherein the extended dimming signal has, for each on-period of the input dimming signal, an on-period exceeding the on-period of the input dimming signal,
      generate a clock signal not synchronized with the input dimming signal, and
      generate a PWM signal pulse, for each on-period of the extended dimming signal, in response to the clock signal having a falling edge during the on-period of the extended dimming signal;
   a direct current-to-direct current (DC-DC) converter configured to supply output voltage to an LED array, by using the PWM signal pulse; and
   an LED driving circuit configured to drive the LED array with a driving current, by using the input dimming signal.

9. The LED driving circuit as claimed in claim 8, wherein the on-period of the extended dimming signal is approximately equal to or longer than the period of the clock signal used to generate the PWM signal pulse.

10. The LED driving circuit as claimed in claim 9, wherein the PWM signal generating circuit is configured to
   reset the clock signal in response to a falling edge of the extended dimming signal, and
   generate the PWM signal pulse having consistent periods.

11. The LED driving circuit as claimed in claim 8, wherein the PWM signal generating circuit comprises:
   an oscillator configured to generate the clock signal;
   a signal extending circuit configured to generate the extended dimming signal; and
   a signal generating circuit configured to generate the PWM signal pulse in response to each falling edge of the clock signal occurring during the on-period of the extended dimming signal.

12. The LED driving circuit as claimed in claim 11, wherein the PWM signal generating circuit unit further comprises:
   a controlling circuit configured to control an operation of the signal generating circuit, by using a feedback voltage based on an output voltage from the DC-DC converter.

13. The LED driving circuit as claimed in claim 11, wherein the signal extending circuit comprises:
   a delay circuit configured to generate a delayed dimming signal by delaying the input dimming signal; and
   an OR gate configured to generate the extended dimming signal based upon a logical-OR operation executed upon the input dimming signal and the delayed dimming signal.

14. The LED driving circuit as claimed in claim 13, wherein the delay circuit is configured to delay the input dimming signal such that the on-period of the extended dimming signal becomes approximately equal to or longer than the period of the clock signal generated by the oscillator.

15. The LED driving circuit as claimed in claim 11, wherein the PWM signal generating circuit further comprises:
   an oscillator reset circuit configured to reset the generation of the clock signal in response to detecting a falling edge of the extended dimming signal.

16. The LED driving circuit as claimed in claim 15, wherein the oscillator reset unit comprises:
   a delay circuit configured to generate a delayed version of the extended dimming signal;
   a NOT gate configured to generate an inverted version of the extended dimming signal; and
   an AND gate configured to generate a reset signal to reset the oscillator based upon a logical-AND operation executed on the delayed version of the extended dimming signal and the inverted version of the extended dimming signal.

17. A method of generating a pulse width modulation (PWM) signal pulse, the method comprising:
   receiving an input dimming signal, the input dimming signal comprising a plurality of pulses alternately having an on-period and off-period;
   generating an extended dimming signal, wherein the extended dimming signal has, for each on-period of the input dimming signal, an on-period exceeding the on-period of the input dimming signal;
   generating a clock signal not synchronized with the input dimming signal; and
   generating the PWM signal pulse for each on-period of the extended dimming signal, in response to the clock signal having a falling edge during the on-period of the extended dimming signal.

18. The method of claim 17, wherein the generating of the extended dimming signal comprises:
   generating a delayed dimming signal by delaying the input dimming signal; and
   generating the extended dimming signal based upon a logical operation executed upon the input dimming signal and the delayed dimming signal.

19. The method of claim 18, wherein the extended dimming signal is generated based upon a logical-OR operation executed upon the input dimming signal and the delayed dimming signal.

20. The method of claim 17, wherein the on-period of the extended dimming signal is approximately equal to or longer than the period of the clock signal.

21. The method of claim 17, wherein the PWM signal pulse is generated in response to each falling edge of the clock signal occurring during an on-period of the extended dimming signal.

* * * * *